US012610892B2

(12) United States Patent
Roberge et al.

(10) Patent No.: US 12,610,892 B2
(45) Date of Patent: Apr. 28, 2026

(54) CONTROL SYSTEM FOR AN AGRICULTURAL BALER

(71) Applicants: CNH Industrial Canada, Ltd., Saskatoon (CA); CNH Industrial America LLC, New Holland, PA (US)

(72) Inventors: Martin J. Roberge, Quebec (CA); Jonathan E. Ricketts, Coal Valley, IL (US); Scott Simmons, Lititz, PA (US); Jason D. Wattonville, Alleman, IA (US); Jordan Beckhusen, McGregor, TX (US)

(73) Assignees: CNH Industrial Canada, Ltd., Saskatoon (CA); CNH Industrial America LLC, New Holland, PA (US)

( * ) Notice: Subject to any disclaimer, the term of this patent is extended or adjusted under 35 U.S.C. 154(b) by 63 days.

(21) Appl. No.: 18/790,645

(22) Filed: Jul. 31, 2024

(65) Prior Publication Data

US 2025/0040488 A1    Feb. 6, 2025

Related U.S. Application Data

(60) Provisional application No. 63/516,582, filed on Jul. 31, 2023.

(51) Int. Cl.
*A01F 15/07* (2006.01)
*B65B 27/12* (2006.01)
(Continued)

(52) U.S. Cl.
CPC .......... *A01F 15/0715* (2013.01); *B65B 27/12* (2013.01); *B65B 57/12* (2013.01);
(Continued)

(58) Field of Classification Search
CPC ........... A01F 15/0715; A01F 2015/072; A01F 2015/076; B65B 27/12; B65B 57/12; B65B 61/005; B65B 2210/04
See application file for complete search history.

(56) References Cited

U.S. PATENT DOCUMENTS 6,651,408 B1 * 11/2003 McClure ............. A01F 15/0715
53/118
6,984,431 B2 1/2006 Mass
(Continued)

FOREIGN PATENT DOCUMENTS

EP            3278658 B1    10/2019

*Primary Examiner* — Andrew M Tecco
(74) *Attorney, Agent, or Firm* — Selene Haedi; Joseph Marcano-Estevez

(57) ABSTRACT

A control system for an agricultural baler includes a controller configured to receive a bale wrap signal indicative of a type of a bale wrap. The controller is also configured to determine whether the bale wrap is segmented or continuous based on the type. Furthermore, the controller is configured to control a braking system to establish a tension force at a weakened section of the bale wrap sufficient to separate a first portion disposed about a bale from a second portion disposed about a shaft in response to determining the bale wrap is segmented and the weakened section is positioned between the shaft and the bale. In addition, the controller is configured to control a cutting system of the agricultural baler to cut the bale wrap in response to determining the bale wrap is continuous and a target section of the bale wrap is positioned at the cutting system.

20 Claims, 3 Drawing Sheets

(51) Int. Cl.
　　*B65B 57/12*　　　　(2006.01)
　　*B65B 61/00*　　　　(2006.01)

(52) U.S. Cl.
　　CPC ...... B65B 61/005 (2013.01); *A01F 2015/072*
　　　　(2013.01); *A01F 2015/076* (2013.01); *B65B*
　　　　　　　　　　　　　　*2210/04* (2013.01)

(56)　　　　　　　References Cited

U.S. PATENT DOCUMENTS

| | | | |
|---|---|---|---|
| 7,409,814 B2 | 8/2008 | Hood | |
| 7,908,822 B2 * | 3/2011 | McClure | A01F 15/0715 53/64 |
| 8,011,295 B1 * | 9/2011 | Smith | A01F 15/148 100/88 |
| 2009/0282788 A1 * | 11/2009 | McClure | A01F 15/0715 53/587 |
| 2022/0272904 A1 * | 9/2022 | Roberge | A01F 15/0715 |

* cited by examiner

CONTROL SYSTEM FOR AN AGRICULTURAL BALER

BACKGROUND

The present disclosure relates generally to a control system for an agricultural baler.

Agricultural balers are used to compress an agricultural product (e.g., cotton) into a package to facilitate storage, transport, and handling of the agricultural product. For example, a round baler may compress the agricultural product into a round bale within a baling chamber, such that the round bale has a desired size and density. After forming the bale, the bale may be wrapped with a bale wrap to secure the agricultural product within the bale and to generally maintain the shape of the bale.

BRIEF DESCRIPTION

In certain embodiments, a control system for an agricultural baler includes a controller having a memory and a processor. The controller is configured to receive a bale wrap signal indicative of a bale wrap type of a bale wrap of a bale wrap assembly. The bale wrap assembly is configured to provide the bale wrap to a bale wrapping system of the agricultural baler. The controller is also configured to determine whether the bale wrap is segmented or continuous based on the bale wrap type. Furthermore, the controller is configured to control a braking system of the agricultural baler to establish a tension force at a weakened section of the bale wrap sufficient to separate a first portion of the bale wrap disposed about a bale from a second portion of the bale wrap disposed about a shaft of the bale wrap assembly in response to determining the bale wrap is segmented and the weakened section is positioned between the shaft of the bale wrap assembly and the bale. In addition, the controller is configured to control a cutting system of the agricultural baler to cut the bale wrap in response to determining the bale wrap is continuous and a target section of the bale wrap is positioned at the cutting system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
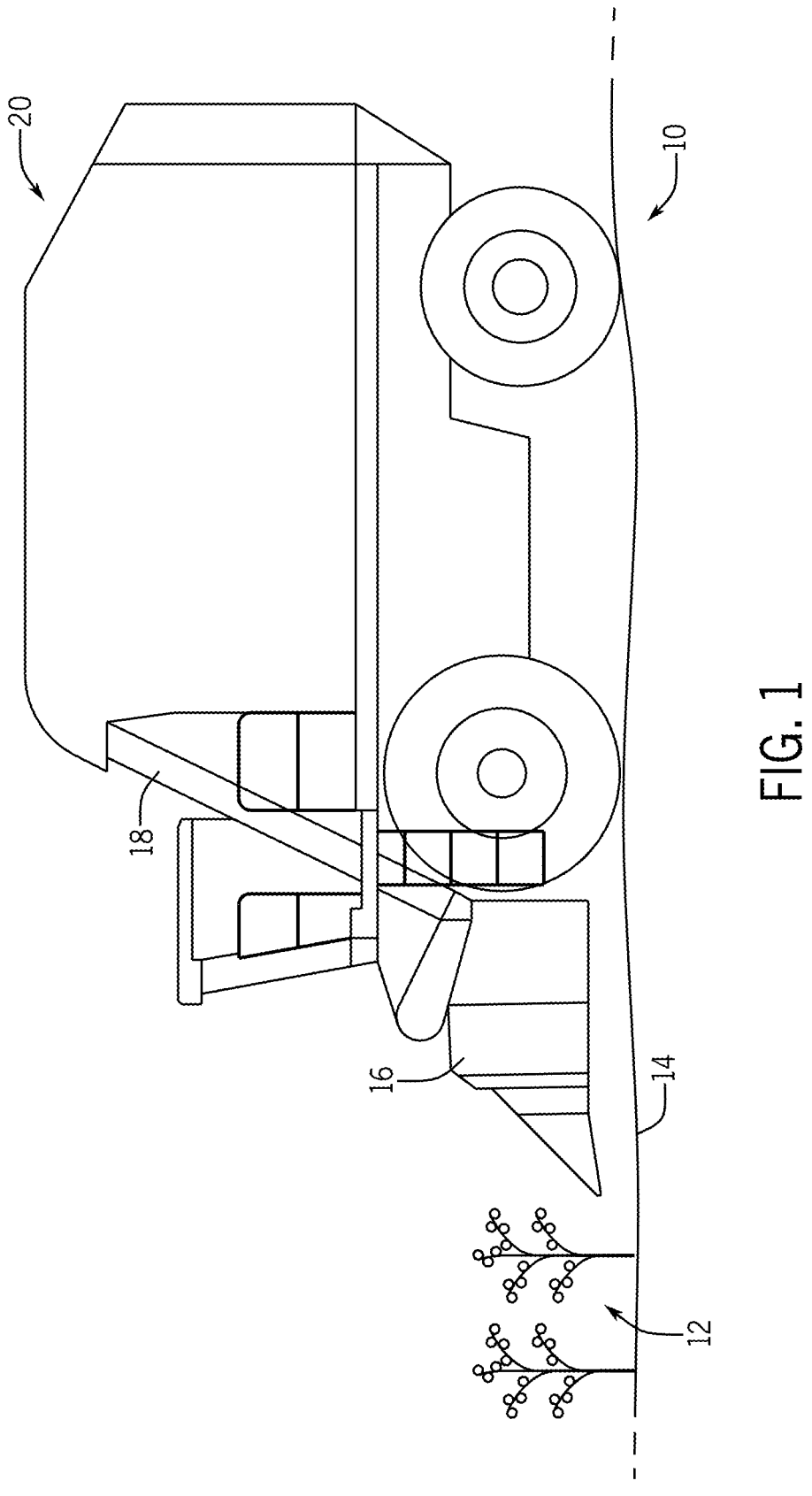
FIG. 1 is a side view of an embodiment of an agricultural system having a bale wrapping system.

FIG. 1 is a side view of an embodiment of an agricultural system 10 (e.g., harvester) having a bale wrapping system. The agricultural system 10 is configured to harvest agricultural product 12 (e.g., cotton) from a field 14 and to form the agricultural product 12 into bales (e.g., agricultural bales). For example, the agricultural system 10 includes a header 16 having drums configured to harvest the agricultural product 12 from the field 14. Additionally, the agricultural system 10 includes an air-assisted conveying system 18 configured to move the agricultural product 12 from the drums of the header 16 to an accumulator. The agricultural product 12 may then be fed into a baler 20 (e.g., agricultural baler), such as via belt(s). The baler 20 is supported by and/or mounted within or on a chassis of the agricultural system 10. As discussed in detail below, the baler 20 may form the agricultural product 12 into round bales. However, in other embodiments, the baler 20 of the agricultural system 10 may form the agricultural product into square bales, polygonal bales, or bales of other suitable shape(s). As described in greater detail below, after forming the agricultural product 12 into a bale, the bale wrapping system of the agricultural system 10 wraps the bale with a bale wrap to secure the agricultural product 12 within the bale and to generally maintain a shape of the bale. A bale wrap assembly, which includes a shaft and the bale wrap disposed about the shaft, provides the bale wrap to the bale wrapping system.

In certain embodiments, the baler includes a control system configured to control certain components of the agricultural system. The control system includes a controller configured to receive a bale wrap signal (e.g., from a user interface and/or from a sensor) indicative of a bale wrap type of the bale wrap. The controller is also configured to determine whether the bale wrap is segmented or continuous based on the bale wrap type. Segmented bale wraps include wrapping sections, each configured to wrap a respective bale, and weakened sections, each positioned between adjacent wrapping sections to facilitate separation of the wrapping sections. In addition, continuous bale wraps include a single continuous wrap. In response to determining the bale wrap is segmented and the weakened section is positioned between the shaft of the bale wrap assembly and the bale, the controller controls a braking system of the baler to establish a tension force at the weakened section sufficient to separate a first portion (e.g., first wrapping section) of the bale wrap disposed about the bale from a second portion (e.g., second wrapping section) of the bale wrap disposed about the shaft of the bale wrap assembly. Furthermore, in response to determining the bale wrap is continuous and a target section of the bale wrap is positioned at a cutting system of the baler, the controller controls the cutting system to cut the bale wrap. Because the control system is configured to control the braking system for segmented bale wraps and control the cutting system for continuous bale wraps, the bale wrapping system may use both segmented bale wraps and continuous bale wraps to wrap bales during the harvesting process.

Figure 2:
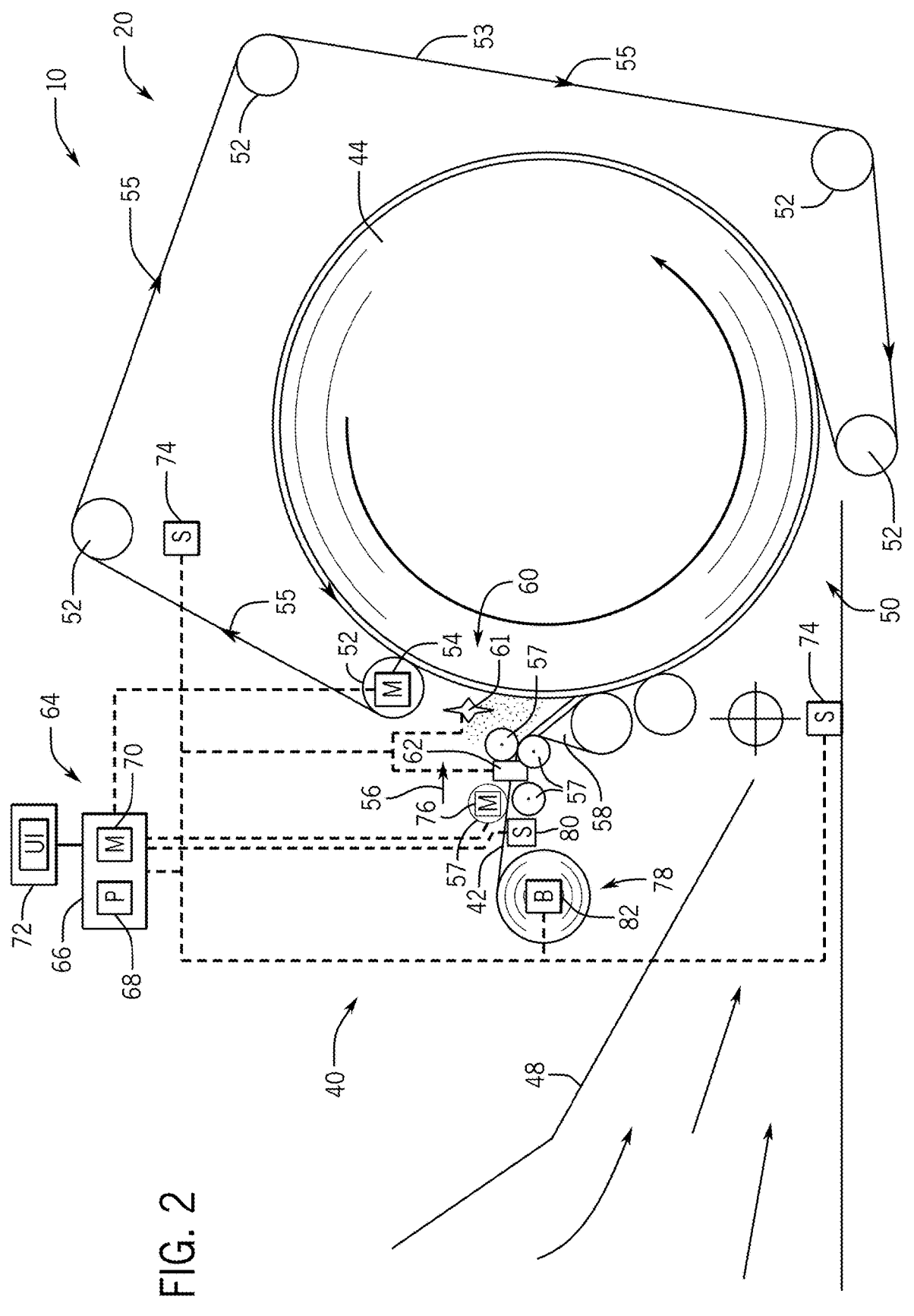
FIG. 2 is a schematic diagram of an embodiment of a bale wrapping system that may be employed within the agricultural system of FIG. 1.

FIG. 2 is a schematic diagram of an embodiment of a bale wrapping system 40 that may be employed within the agricultural system 10 of FIG. 1. A bale wrap 42 is configured to wrap around a bale 44 (e.g., a bale of the agricultural product, an agricultural bale, etc.) formed by the baler 20 of the agricultural system 10. As cotton or another agricultural product is harvested, the agricultural product flows into an accumulator 48 (e.g., bale chamber) and/or a feeding system. For example, cotton may be blown by the air-assisted conveying system into the accumulator/bale chamber 48. The cotton may then be fed into a cavity 50 of the baler 20 (e.g., by belt(s), auger(s), etc.). The baler 20 includes multiple rollers 52 that support and/or drive rotation of one or more belts 53. For example, one or more rollers 52 engage the belt(s) 53, which enable the belt(s) 53 to move along the pathway defined by the rollers 52 and the bale 44. One or more rollers are driven to rotate via a belt drive system 54 (e.g., including electric motor(s), hydraulic motor(s), pneumatic motor(s), etc.). The belt(s) 53 circulate around the pathway defined by the rollers 52 and the bale 44, as indicated by arrows 55. Movement of the belt(s) 53 captures agricultural product from the accumulator 48 and draws the agricultural product into the cavity 50, where the agricultural product is gradually built up to form the bale 44. As the agricultural product builds within the cavity 50, one or more of the rollers 52 may move radially outwardly to accommodate the increasing size of the bale 44.

Once the bale 44 reaches a desired size, the bale wrapping system 40 wraps the bale 44 with the bale wrap 42 to secure the agricultural product within the bale 44 and to generally maintain a shape of the bale 44, such as the round shape in the illustrated embodiment. In other embodiments, the shape of the bale may be rectangular, polygonal, or another suitable shape. The bale wrap 42 is fed into contact with the bale 44 along a bale wrap movement direction 56 using one or more feed rollers 57. The feed rollers 57 drive the bale wrap 42 over a wrap guide or wrap applicator 58 (e.g., duckbill). The wrap guide/wrap applicator 58 is configured to move (e.g., rotate) to direct the bale wrap 42 into contact with the bale 44. The bale wrap 42 is captured between the bale 44 and the belt(s) 53. Accordingly, rotation of the bale 44 draws the bale wrap 42 around the bale 44, thereby wrapping the bale 44.

In certain embodiments, to secure the bale wrap 42 around the bale 44, the bale wrapping system 40 includes an adhesive system 60. The adhesive system 60 includes one or more sprayers 61 that spray an adhesive onto the bale wrap 42 (e.g., onto one side of the bale wrap 42). Additionally or alternatively, the sprayer(s) may spray an activator (e.g., water) onto the bale wrap 42 to activate an adhesive (e.g., by dissolving a water-soluble film disposed over an adhesive, by chemically activating a powder embedded within the bale wrap, etc.). For example, in certain embodiments, the bale wrap 42 includes a protective film disposed over an adhesive. The protective film may be water-soluble. Accordingly, spraying water on the protective film dissolves the protective film, thereby activating the adhesive. Furthermore, in certain embodiments, the adhesive includes a powder disposed on and/or partially embedded in the bale wrap 42, and the activator (e.g., water) is configured to chemically activate the powder to form the adhesive. In addition, in certain embodiments, the adhesive system includes a rotating brush, and the bale wrap 42 includes a protective film disposed over an adhesive. The rotating brush may engage the protective film, thereby removing the protective film, which activates the adhesive. Once the adhesive is applied or activated, engagement of the adhesive with another portion of the bale wrap secures the bale wrap to itself, thereby securing the bale wrap 42 around the bale 44. For example, a first portion of the bale wrap 42 couples (e.g., adheres) to a second portion of the bale wrap 42 with the adhesive provided by or activated by the adhesive system 60 as the first portion overlaps the second portion.

In certain embodiments, after the bale wrap 42 is wrapped around the bale 44, the bale wrap 42 is cut with a cutting system 62 to separate additional bale wrap 42 (e.g., on a shaft of a bale wrap assembly) from the bale wrap 42 surrounding the bale 44. The cutting system 62 may include a cutting mechanism, an actuation assembly coupled to the cutting mechanism, and a track. In some embodiments, the actuation assembly is configured to move the cutting mechanism along the track to selectively drive the cutting mechanism into engagement with the bale wrap 42. The cutting mechanism may include a knife that engages the bale wrap 42 to cut the bale wrap 42. In other embodiments, the cutting mechanism may include other suitable mechanism(s) configured to cut the bale wrap (e.g., a rotary knife, a duckbill knife, a saw, a shear bar, etc.).

In the illustrated embodiment, the agricultural system 10 (e.g., the baler 20 of the agricultural system 10) includes a control system 64 having a controller 66. In the illustrated embodiment, the controller 66 includes a processor 68 and a memory 70. The processor 68 (e.g., microprocessor) may be used to execute software, such as software stored in the memory 70 for controlling the bale wrapping system 40 (e.g., for controlling rotation of the bale 44, the adhesive system 60, the cutting system 62, etc.). Moreover, the processor 68 may include multiple microprocessors, one or more "general-purpose" microprocessors, one or more special-purpose microprocessors, and/or one or more application specific integrated circuits (ASICS), or some combination thereof. For example, the processor 68 may include one or more reduced instruction set (RISC) or complex instruction set (CISC) processors.

The memory 70 may include a volatile memory, such as random-access memory (RAM), and/or a nonvolatile memory, such as read-only memory (ROM). The memory 70 may store a variety of information and may be used for various purposes. For example, the memory 70 may store processor-executable instructions (e.g., firmware or software) for the processor 68 to execute, such as instructions for controlling the bale wrapping system 40. In certain embodiments, the controller 66 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the bale wrapping system 40), and any other suitable data. The controller may be positioned at any suitable location(s) on the agricultural system 10 (e.g., as one element in one location or as multiple elements in multiple locations).

Additionally, the control system 64 includes a user interface 72 communicatively coupled to the controller 66. The user interface 72 may be configured to provide information to an operator (e.g., indicative of the rotation rate of the bale 44, the belt speed of the belt(s) 53, a size of the bale 44, an amount of adhesive/activator remaining, other suitable parameter(s), or a combination thereof). Additionally, the user interface 72 may be configured to enable operator interactions with the bale wrapping system 40, such as control of the adhesive activation system 60, control of the cutting system 62, control of the belt(s) 53, control of other parameter(s), or a combination thereof. For example, the user interface 72 may include a display and/or other user interaction device(s) (e.g., button(s)) configured to enable operator interactions.

The controller 66 may be configured to control rotation of the belt(s) 53 and/or a belt speed of the belt(s) 53. For example, in the illustrated embodiment, the controller 66 is communicatively coupled to the belt drive system 54, and the controller 66 is configured to control a rotation rate of one or more rollers 52 to control the belt speed of the belt(s) 53. The controller 66 may control the belt speed of the belt(s) 53 in response to feedback from one or more sensors 74. The sensor(s) 74 are communicatively coupled to the controller 66, and the sensor(s) 74 are configured to output sensor signal(s) indicative of a flow rate of agricultural product, size of the bale 44, other suitable parameter(s), or a combination thereof.

In some embodiments, upon determining the bale 44 has reached a desired size (e.g., based on feedback from the sensor(s) 74), the controller 66 may automatically activate a bale wrapping process. For example, the controller 66 may receive signal(s) from the sensor(s) 74 indicative of the size of the bale 44 (e.g., weight, diameter, circumference, etc.). Upon determining the bale 44 has reached a target size, the controller 66 may activate the bale wrapping system 40 to initiate the bale wrapping process. For example, in the illustrated embodiment, the controller 66 is communicatively coupled to a bale wrap drive system 76 (e.g., including electric motor(s), hydraulic motor(s), pneumatic motor(s), etc.), which is coupled to one or more feed rollers 57 and configured to drive the feed roller(s) 57 to rotate, thereby driving the bale wrap 42 to move toward the bale 44 along the bale wrap movement direction 56. In the illustrated embodiment, the bale wrap 42 is fed from a bale wrap assembly 78, which includes a shaft and the bale wrap 42 disposed about the shaft. The controller 66 may activate the bale wrap drive system 76 to begin feeding the bale wrap 42 toward the bale 44. In some embodiments, the wrap guide 58 (e.g., duckbill) may be actuated (e.g., rotated), which drives the bale wrap 42 into contact with the bale 44. As previously discussed, the bale wrap 42 is captured between the bale 44 and the belt(s) 53. Accordingly, rotation of the belt(s) 53 draws the bale wrap 42 around the bale 44.

In the illustrated embodiment, the controller 66 is configured to receive a bale wrap signal indicative of a bale wrap type of the bale wrap 42 of the bale wrap assembly 78. As previously discussed, the bale wrap assembly 78 is configured to provide the bale wrap 42 to the bale wrapping system 40 of the baler. In certain embodiments, bale wraps may be organized into two types, including segmented bale wraps and continuous bale wraps. Segmented bale wraps include wrapping sections, each configured to wrap a respective bale, and weakened sections, each positioned between adjacent wrapping sections to facilitate separation of the wrapping sections. In addition, continuous bale wraps include a single continuous wrap. Furthermore, in certain embodiments, the bale wraps may be organized into a larger number of types, with each type being a segmented bale wrap or a continuous bale wrap. For example, types of continuous bale wraps may include a continuous bale wrap formed from natural material, a continuous bale wrap formed from a low tensile strength polymeric material, a continuous bale wrap formed from a high tensile strength polymeric material, etc. Furthermore, types of segmented bale wraps may include segmented bale wraps formed from natural material with perforated weakened sections, segmented bale wraps formed from polymeric material with perforated weakened sections, segmented bale wraps formed from polymeric material with wrapping sections coupled to one another by adhesive at the respective weakened sections, etc.

In certain embodiments, the user interface 72 is configured to output the bale wrap signal in response to operator input. For example, various bale wrap types may be stored within the controller 66, and the controller may instruct the user interface to present a list of the stored bale wrap types to the user. The user may input the bale wrap type to the user interface by selecting the bale wrap type of the bale wrap 42 of the bale wrap assembly 78 from the list. In addition, the operator may input a new bale wrap type if the bale wrap type of the bale wrap of the bale wrap assembly is not stored within the controller. The operator may input various properties of the new bale wrap type, such as whether the bale wrap is segmented or continuous, the material(s) forming the bale wrap, the tensile strength of the bale wrap, the type of weakened section (e.g., perforated, adhesive based, etc.), etc.

Furthermore, in certain embodiments, the control system 64 includes a sensor 80 communicatively coupled to the controller 66, in which the sensor 80 is configured to output the bale wrap signal indicative of the bale wrap type of the bale wrap 42 of the bale wrap assembly 78. In certain embodiments, the sensor 80 is configured to monitor an identifier of the bale wrap 42, and the sensor 80 is configured to output the bale wrap signal based on the identifier. For example, the identifier may include identification information printed onto the bale wrap 42, a sticker having identification information applied to the bale wrap 42, or a radio frequency identification (RFID) tag coupled to the bale wrap 42. The identification information/RFID tag may facilitate identification and tracking of the wrapped bale. For example, in certain embodiments, the identification information may include a machine-readable code, such as a bar code or a quick response (QR) code. Accordingly, the identification information may enable an automated system to identify the wrapped bale while the wrapped bale is in the field and while the wrapped bale is being transported, thereby facilitating tracking of the wrapped bale. Furthermore, in certain embodiments, the identification information may include text (e.g., alone or in combination with the machine-readable code), such as an identification code (e.g., unique to each wrapped bale). In embodiments in which the identifier includes identification information (e.g., printed onto the bale wrap or applied to the bale wrap via a sticker), the sensor 80 includes an optical sensing device configured to monitor the identification information (e.g., bar code, QR code, text, etc.) and to output the bale wrap signal to the controller 66. Furthermore, in embodiments in which the identifier includes an RFID tag, the sensor 80 includes an RFID reader configured to monitor the RFID tag and to output the bale wrap signal to the controller 66. The controller 66 may store data correlating various identification information/RFID tag information with corresponding bale wrap types. Accordingly, the controller may determine the bale wrap type based on the identification information/RFID tag information. While identifiers including identification information printed onto the bale wrap, a sticker having identification information applied to the bale wrap, and an RFID tag coupled to the bale wrap are disclosed above, in certain embodiments, other suitable identifier(s) may be disposed on the bale wrap.

Certain segmented bale wraps may include perforations at each weakened section, thereby facilitating separation of the respective wrapping sections at the weakened section. In certain embodiments, the sensor 80 may include an optical sensor configured to detect perforations at the weakened section of the segmented bale wrap. In such embodiments, the sensor 80 may output the bale wrap signal based on detection of the perforations at the weakened section. For example, the sensor 80 may include a light source configured to emit light toward the bale wrap and a light detector positioned on the opposite side of the bale wrap from the light source. The sensor 80 may detect the perforations in response to receiving a pattern of light consistent with the light from the light source passing through the perforations. The controller 66 may determine the bale wrap is segmented in response to receiving the bale wrap signal indicative of presence of the perforations, which is indicative of the bale wrap type. Otherwise, the controller 66 may determine the bale wrap is continuous. For example, in response to not receiving the bale wrap signal indicative of presence of the perforations or receiving the bale wrap signal indicative of absence of the perforations over a certain length of the bale wrap (e.g., the length of the bale wrap sufficient to wrap the bale a certain number of times), the controller 66 may determine the bale wrap is continuous.

Furthermore, certain bale wraps may include wrapping sections coupled to one another by adhesive at the respective weakened sections. In such embodiments, the thickness of the bale wrap may be greater at the weakened sections due to the overlap of the wrapping material at the weakened sections. Accordingly, the sensor 80 may be configured to detect the variations in thickness of the bale wrap due to the presence of the weakened sections. The sensor 80 may output the bale wrap signal based on detection of the thickness variations due to the weakened sections. For example, the sensor 80 may include an optical sensor, a capacitance sensor, opposing rollers configured to engage the bale wrap, etc. The controller 66 may determine the bale wrap is segmented in response to receiving the bale wrap signal indicative of presence of the thickness variations due to the weakened sections, which is indicative of the bale wrap type. Otherwise, the controller 66 may determine the bale wrap is continuous. While sensors configured to monitor an identifier on the bale wrap, to detect perforations, and to detect thickness variations are disclosed above, in certain embodiments, the control system may include other suitable type(s) of sensor(s) configured to output the bale wrap signal. In certain embodiments, the controller 66 is configured to control the user interface 72 to present the bale wrap type, as determined based on feedback from the sensor 80, to the operator. Furthermore, in certain embodiments, the controller 66 may enable the operator to input a different bale wrap type (e.g., override the bale wrap type determined based on feedback from the sensor) via the user interface 72.

Furthermore, the controller 66 is configured to determine whether the bale wrap 42 is segmented or continuous based on the bale wrap type. For example, if the bale wraps are organized in two types, segmented and continuous, the controller may directly determine whether the bale wrap is segmented or continuous based on the bale wrap type (e.g., segmented or continuous). Furthermore, if the bale wraps are organized into a larger number of types, the controller 66 may determine whether the bale wrap is segmented or continuous based on data stored within the controller 66. For example, the controller 66 may store properties associated with each bale wrap type, and one of the properties may include whether the bale wrap is segmented or continuous. Accordingly, the controller 66 may determine whether the bale wrap is segmented or continuous based on the bale wrap type and the data associated with the bale wrap type. In certain embodiments, the controller 66 may control the user interface 72 to present an indication to the operator of whether the bale wrap 42 is segmented or continuous.

In addition, the controller 66 is communicatively coupled to the cutting system 62, and the controller 66 is configured to control the cutting system 62. For example, the controller 66 may control engagement of a cutting mechanism of the cutting system 62 with the bale wrap 42, such that the cutting mechanism cuts the bale wrap 42. The controller 66 controls the cutting system 62 to cut the bale wrap 42 in response to determining the bale wrap 42 is continuous and a target section of the bale wrap is positioned at the cutting system 62. Once the bale wrap 42 is cut, the controller 66 controls the bale wrap drive system 76 to terminate feeding of the bale wrap 42, and the controller controls the belt drive system 54 to continue rotation of the bale 44, such that the bale wrap 42 continues to rotate with the bale 44, thereby enabling the adhesive to coupled the bale wrap 42 to itself, which secures the bale wrap 42 around the bale 44.

In certain embodiments, the controller 66 may determine the target section based on feedback from the sensor(s) 74. For example, the sensor(s) 74 may output sensor signal(s) indicative of a number of wraps of bale wrap 42 around the bale 44. The number of wraps may include complete wraps and partial wraps, such that the number of wraps may be an integer or non-integer value (e.g., 1 wrap, 1.25 wraps, 1.5 wraps, 1.75 wraps, 2 wraps, etc.). The controller 66 may determine the target section based on the number of wraps (e.g., as determined based on feedback from the sensor(s) 74). For example, the controller 66 may determine that two complete wraps of the bale wrap 42 around the bale 44 is desired (e.g., based on user input indicative of the desired number of wraps). The controller 66, using feedback from the sensor(s) 74, may determine the target section such that cutting the bale wrap at the target section causes the bale wrap 42 to wrap around the bale 44 two times.

In certain embodiments, the controller 66 is configured to determine the target section of the bale wrap 42 based on a density of the bale 44. For example, if the tension of the belt(s) 53 is lower, a lower density bale 44 may be formed, and if the tension of the belt(s) 53 is higher, a higher density bale 44 may be formed. In certain embodiments, the tension of the belt(s) 53 may be adjustable, as disclosed in detail below, thereby facilitating adjustment of the density of the bale 44. Furthermore, the force applied by the bale 44 to the bale wrap 42 may be based on the density of the bale 44. For example, a higher density bale 44 may apply a greater force to the bale wrap 42, and a lower density bale 44 may apply a smaller force to the bale wrap 42. Accordingly, for a bale wrap having a particular tensile strength, the controller 66 may determine a target number of wraps based on the density of the bale 44. The controller 66 (e.g., using feedback from the sensor(s) 74) may then determine the target section such that cutting the bale wrap at the target section causes the bale wrap 42 to wrap around the bale the target number of times. Accordingly, the controller 66 determines the target section of the bale wrap 42 based on the density of the bale 44. In certain embodiments, the controller 66 may determine the target section (e.g., by first determining the target number of wraps) based on the density of the bale 44 and the tensile strength of the bale wrap 42. For example, the controller 66 may identify the tensile strength based on the bale wrap type (e.g., the tensile strength may be a property associated with the bale wrap type that is stored within the controller).

In the illustrated embodiment, the baler 20 includes a braking system 82 configured to control a tension force on the bale wrap 42 (e.g., tension within the bale wrap 42) and, in certain embodiments, to stretch the bale wrap, such as 5 percent to 15 percent (e.g., to enhance the force applied by the bale wrap to the bale and/or to increase the strength of the bale wrap). In certain embodiments, the braking system 82 may vary the tension force on the bale wrap 42 as the bale wrap 42 wraps around the bale 44. For example, the braking system may reduce the tension force on the bale wrap 42 during the final wrap of the bale wrap around the bale to enhance the effectiveness of the adhesive in securing the bale wrap to itself. In certain embodiments, the braking system 82 may reduce the rotational speed of the shaft of the bale wrap assembly 78, thereby inducing tension within the bale wrap 42 and, in certain embodiments, stretching the bale wrap 42. Furthermore, in certain embodiments, the braking system 82 may control application of force of a braking element (e.g., a brake, etc.) against the bale wrap, thereby inducing tension within the bale wrap and, in certain embodiments, stretching the bale wrap 42. In addition, in certain embodiments, the braking system 82 may reduce the rotational speed of the feed rollers 57, thereby inducing tension within the bale wrap 42 and, in certain embodiments, stretching the bale wrap 42. In response to determining the bale wrap 42 is segmented and the weakened section is positioned between the shaft of the bale wrap assembly 78 and the bale 44, the controller 66 controls the braking system 82 to establish a tension force at the weakened section of the bale wrap 42 sufficient to separate a first portion (e.g., first wrapping section) of the bale wrap disposed about the bale 44 from a second portion (e.g., second wrapping section) of the bale wrap disposed about the shaft of the bale wrap assembly 78. For example, the sensor(s) 74, 80 may be configured to output sensor signal(s) indicative of the weakened section being positioned between the shaft of the bale wrap assembly 78 and the bale 44. For example, the identifier may be positioned proximate to/at the weakened section, and the sensor 80 may detect the identifier between the shaft of the bale wrap assembly and the bale. By way of further example, the sensor 80 may detect the perforations between the shaft of the bale wrap assembly and the bale. The controller may be configured to receive the sensor signal(s) and determine that the weakened section is position between the bale wrap assembly shaft and the bale. While the bale continues to rotate, the controller may control the braking system such that the tension force at the weakened section is sufficient to separate the first portion of the bale wrap disposed about the bale from the second portion of the bale wrap disposed about the shaft of the bale wrap assembly. Once the bale wrap is separated, the first portion of the bale wrap 42 continues to rotate with the bale 44, thereby enabling the adhesive to coupled the bale wrap 42 to itself, which secures the bale wrap 42 around the bale 44.

In certain embodiments, the controller 66 may control the adhesive activation system 60, the cutting system 62, the bale wrap drive system 76, the braking system 82, the belt drive system 54, or a combination thereof, to control the bale wrapping process. For example, in response to the controller 66 determining that the bale 44 is in condition for wrapping, the controller 66 may control the belt drive system 54 to control the belt speed of the belt(s) 53, such that the belt(s) 53 reach a target belt speed for wrapping the bale 44. The target belt speed for wrapping the bale may be greater than or less than a target belt speed for bale formation. In certain embodiments, the belt speed may not be adjusted for wrapping the bale 44 (e.g., the target belt speed for wrapping the bale may be equal to the target belt speed for bale formation). The controller 66 may determine that the bale 44 is in condition for wrapping based on a weight of the bale 44 (e.g., based on feedback from the sensor(s) 74), a duration of the bale forming process, instructions from another controller (e.g., a harvester controller) to wrap the bale 44, based on a size of the bale 44 (e.g., based on feedback from the sensor(s) 74), other suitable parameter(s), or a combination thereof.

In response to determining the bale is in condition for wrapping, the controller 66 may control the bale wrap drive system 76 to feed the bale wrap 42 toward the bale 44. The controller 66 may then output a signal to actuate the adhesive system 60 to apply the adhesive to the bale wrap 42 or to activate the adhesive of the bale wrap 42. Furthermore, in response to determining the bale wrap 42 is continuous and the target section of the bale wrap 42 is positioned at the cutting system 62, the controller 66 may control the cutting system 62 to cut the bale wrap 42. Thereafter, the controller 66 may control the belt drive system 54 to stop rotation of the belt(s) 53. In certain embodiments, the controller 66 may control the belt drive system 54 to stop rotation of the belt(s) 53 in response to determining the target section of the bale wrap 42 is positioned at the cutting system 62. The controller 66 may then output a signal to the cutting system 62 to drive the cutting mechanism into engagement with the bale wrap 42, thereby cutting the bale wrap 42. Thereafter, the controller 66 may control the belt drive system 54 to restart rotation of the belt(s) 53 to enable the adhesive to secure the bale wrap to itself, thereby securing the bale wrap 42 around the bale 44. The controller 66 may then control the belt drive system 54 to stop rotation of the belt(s) 53. Furthermore, in response to determining the bale wrap 42 is segmented and the weakened section is positioned between the shaft of the bale wrap assembly 78 and the bale 44, the controller 66 may control the braking system 82 to establish a tension force at the weakened section of the bale wrap 42 sufficient to separate a first portion of the bale wrap 42 disposed about the bale 44 from a second portion of the bale wrap 42 disposed about the shaft of the bale wrap assembly 78. Thereafter, the controller 66 may control the belt drive system 54 to stop rotation of the belt(s) 53 (e.g., after the adhesive secures the bale wrap to itself). The wrapped bale may then be ejected from the baler 20 (e.g., ejected from the agricultural system 10).

Figure 3:
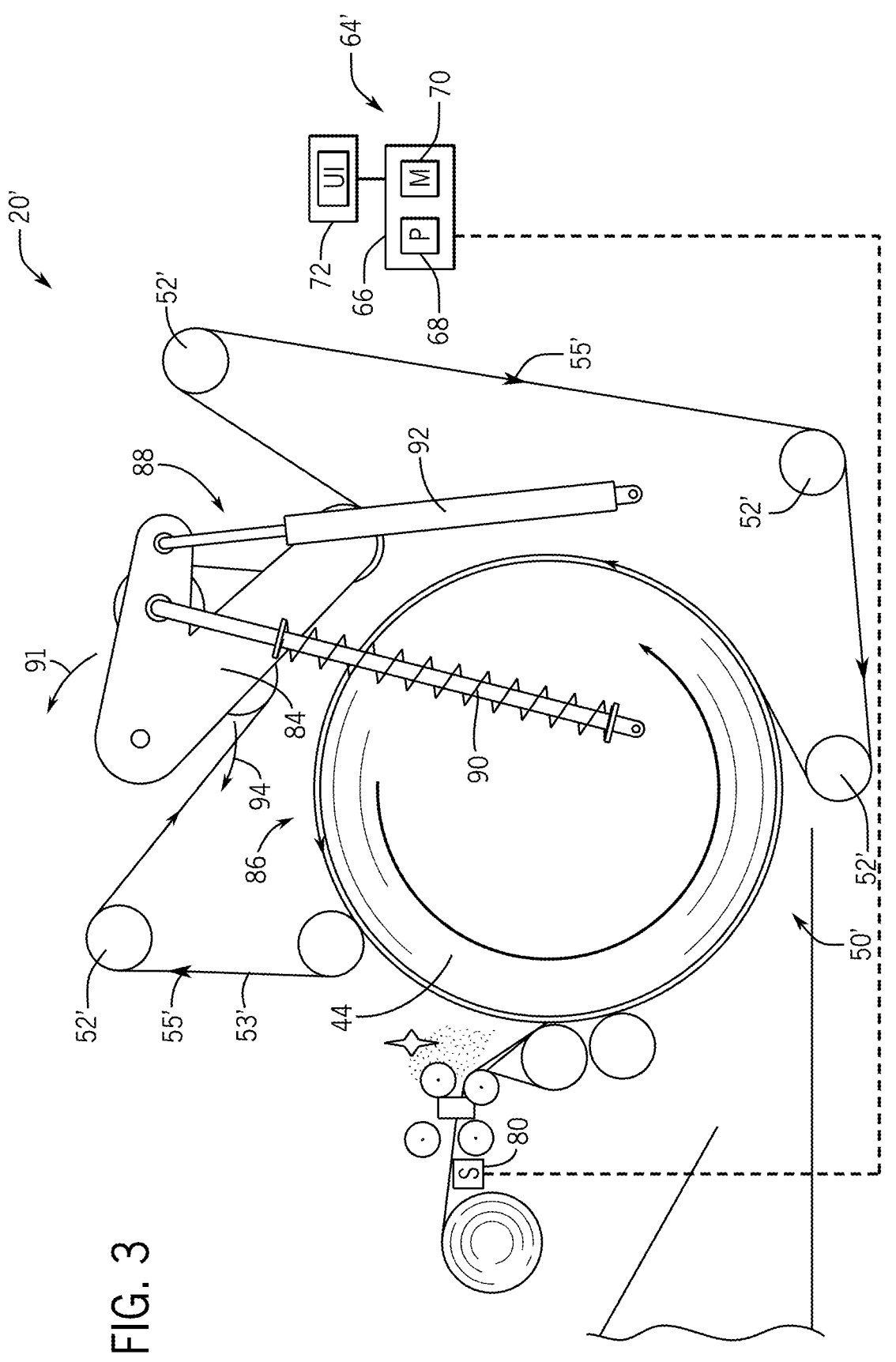
FIG. 3 is a schematic diagram of an embodiment of a baler that may be employed within the agricultural system of FIG. 1.

FIG. 3 is a schematic diagram of an embodiment of a baler 20' that may be employed within the agricultural system of FIG. 1. In the illustrated embodiment, the baler 20' includes multiple rollers 52' that support and/or drive rotation of one or more belts 53'. For example, one or more rollers 52' engage the belt(s) 53, which enable the belt(s) 53' to move along the pathway defined by the rollers 52' and the bale 44. One or more rollers 52' are driven to rotate via a belt drive system 54' (e.g., including electric motor(s), hydraulic motor (s), pneumatic motor(s), etc.). The belt(s) 53' circulate around the pathway defined by the rollers 52' and the bale 44, as indicated by arrows 55'. Movement of the belt(s) 53' captures agricultural product from the accumulator and draws the agricultural product into the cavity 50', where the agricultural product is gradually built up to form the bale 44.

In the illustrated embodiment, the baler 20' includes a tension arm 84 configured to establish tension within the belt(s) 53'. As the agricultural product builds within the cavity 50', the agricultural product applies a force to the belt(s) 53' that urges a first portion 86 of the belt(s) 53' surrounding the bale 44 to expand. Concurrently, the size of a second portion 88 (e.g., serpentine portion) of the belt(s) 53' is reduced. Accordingly, the second portion 88 of the belt(s) 53' provides the increasing belt length for the expanding first portion 86. In the illustrated embodiment, the second portion 88 of the belt(s) 53' is established by fixed rollers 52' (e.g., rollers fixed to a housing/frame of the baler 20') and rollers 52' coupled to the tension arm 84, which is pivotable relative to the fixed rollers 52' (e.g., relative to the housing/frame of the baler 20'). Accordingly, as the agricultural product builds within the cavity 50', the tension arm 84 is driven to rotate in a first direction 91, thereby reducing the size of the second portion 88 and enabling the first portion 86 to expand.

In the illustrated embodiment, the baler 20' includes a tension arm spring 90 and a tension arm actuator 92. The tension arm spring 90 and the tension arm actuator 92 are configured to apply respective forces to the tension arm 84, thereby urging the tension arm 84 to rotate in a second direction 94, opposite the first direction 91. Accordingly, the tension arm spring 90 and the tension arm actuator 92 urge the tension arm 84 to resist rotation as the first portion 86 of the belt(s) 53' expands, thereby establishing tension within the belt(s) 53'. For example, greater force applied by the tension arm spring 90 and the tension arm actuator 92 to the tension arm 84 may cause greater tension within the belt(s) 53'. In addition, greater tension within the belt(s) 53' may cause increased density of the agricultural product within the resulting bale 44. Accordingly, the density of the bale 44 may be controlled by controlling the force applied to the tension arm 84. While the baler 20' includes one tension arm spring 90 in the illustrated embodiment, in other embodiments, the baler may include more or fewer tension arm springs. For example, in certain embodiments, the tension arm spring may be omitted. Furthermore, while the baler 20' includes a single tension arm actuator 92 in the illustrated embodiment, in other embodiments, the baler may include additional tension arm actuator(s).

In the illustrated embodiment, the baler 20' includes a control system 64'. The control system 64' includes the controller 66 and the user interface 72, as disclosed above with reference to FIG. 2. However, in other embodiments, the control system 64' may have another suitable electronic controller. In the illustrated embodiment, the tension arm actuator 92 is communicatively coupled to the controller 66, and the controller 66 is configured to control the tension arm actuator 92 to control the tension within the belt(s) 53'.

In the illustrated embodiment, the controller 66 is configured to receive the bale wrap signal indicative of the bale wrap type of the bale wrap of the bale wrap assembly. As previously discussed, the bale wrap assembly is configured to provide the bale wrap to the bale wrapping system of the baler. Furthermore, as previously discussed, bale wraps may be organized into a number of types. For example, the types of bale wraps may include a bale wrap (e.g., either continuous or segmented) formed from a high tensile strength polymeric material, a bale wrap (e.g., either continuous or segmented) formed from a low tensile strength polymeric material, a bale wrap (e.g., either continuous or segmented) formed from a natural material, etc. Tensile strength may be a property associated with each bale wrap type (e.g., that is stored within the controller).

As previously discussed, the user interface 72 may be configured to output the bale wrap signal in response to operator input. For example, various bale wrap types may be stored within the controller 66, and the controller may instruct the user interface to present a list of the stored bale wrap types to the user. The user may input the bale wrap type to the user interface by selecting the bale wrap type of the bale wrap of the bale wrap assembly from the list. In addition, the operator may input a new bale wrap type if the bale wrap type of the bale wrap of the bale wrap assembly is not stored within the controller. The operator may input various properties of the new bale wrap type, such as the tensile strength of the bale wrap.

Furthermore, in certain embodiments, the control system 64' includes the sensor 80, which is communicatively coupled to the controller 66. As previously discussed, the sensor 80 is configured to output the bale wrap signal indicative of the bale wrap type of the bale wrap of the bale wrap assembly. In certain embodiments, the sensor 80 is configured to monitor an identifier of the bale wrap, and the sensor 80 is configured to output the bale wrap signal based on the identifier. For example, the identifier may include identification information printed onto the bale wrap, a sticker having identification information applied to the bale wrap, or a radio frequency identification (RFID) tag coupled to the bale wrap. The identification information/RFID tag may facilitate identification and tracking of the wrapped bale. For example, in certain embodiments, the identification information may include a machine-readable code, such as a bar code or a quick response (QR) code. Accordingly, the identification information may enable an automated system to identify the wrapped bale while the wrapped bale is in the field and while the wrapped bale is being transported, thereby facilitating tracking of the wrapped bale. Furthermore, in certain embodiments, the identification information may include text (e.g., alone or in combination with the machine-readable code), such as an identification code (e.g., unique to each wrapped bale). In embodiments in which the identifier includes identification information (e.g., printed onto the bale wrap or applied to the bale wrap via a sticker), the sensor 80 includes an optical sensing device configured to monitor the identification information (e.g., bar code, QR code, text, etc.) and to output the bale wrap signal to the controller 66. Furthermore, in embodiments in which the identifier includes an RFID tag, the sensor 80 includes an RFID reader configured to monitor the RFID tag and to output the bale wrap signal to the controller 66. The controller 66 may store data correlating various identification information/RFID tag information with corresponding bale wrap types. Accordingly, the controller may determine the bale wrap type based on the identification information/RFID tag information. While identifiers including identification information printed onto the bale wrap, a sticker having identification information applied to the bale wrap, and an RFID tag coupled to the bale wrap are disclosed above, in certain embodiments, other suitable identifier(s) may be disposed on the bale wrap.

Furthermore, the controller 66 is configured to control the tension arm actuator 92 based on the bale wrap type to control the density of the bale 44. For example, the controller 66 may identify the tensile strength of the bale wrap based on the bale wrap type (e.g., the tensile strength may be a property associated with the bale wrap type that is stored within the controller). For a bale wrap having a higher tensile strength, the controller may control the tension arm actuator 92 to increase the tension within the belt(s) 53, thereby increasing the density of the bale 44. In addition, for a bale wrap having a lower tensile strength, the controller may control the tension arm actuator 92 to decrease the tension within the belt(s) 53, thereby decreasing the density of the bale 44. Accordingly, the bale 44 may have a suitable density for the bale wrap type of the bale wrap disposed about the bale 44.

The controller 66 of the control system 64' may be configured to perform the control functions associated with controlling the tension arm actuator 92 based on the bale wrap type alone or in combination with the control functions disclosed with reference to FIG. 2. For example, in certain embodiments, the controller 66 of the control system 64' may be configured to determine the target section of the bale wrap based on the density of the bale, and the controller may be configured to control the cutting system to cut the bale wrap in response to determining the target section of the bale wrap is positioned at the cutting system, as disclosed with reference to FIG. 2. Furthermore, in certain embodiments, the controller 66 of the control system 64' may be configured to receive a signal indicative of a number of wraps of the bale wrap around the bale, the controller may be configured to determine the target section based on the number of wraps, and the controller may be configured to control the cutting system to cut the bale wrap in response to determining the target section of the bale wrap is positioned at the cutting system, as disclosed with reference to FIG. 2. In addition, in certain embodiments, the controller 66 of the control system 64' may be configured to determine whether the bale wrap is segmented or continuous based on the bale wrap type, the controller may be configured to control the braking system to establish a tension force at a weakened section of the bale wrap sufficient to separate a first portion of the bale wrap disposed about the bale from a second portion of the bale wrap disposed about the shaft of the bale wrap assembly in response to determining the bale wrap is segmented and the weakened section is positioned between the shaft of the bale wrap assembly and the bale, and the controller may be configured to control the cutting system to cut the bale wrap in response to determining the bale wrap is continuous and a target section of the bale wrap is positioned at the cutting system, as disclosed with reference to FIG. 2. In addition, in certain embodiments, the controller may be configured to perform the control functions associated with determining the target section of the bale wrap based on the density of the bale, as disclosed with reference to FIG. 2, alone (e.g., without performing any of the other disclosed control functions).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A control system for an agricultural baler, comprising:
a controller comprising a memory and a processor, wherein the controller is configured to:

receive a bale wrap signal indicative of a bale wrap type of a bale wrap of a bale wrap assembly, wherein the bale wrap assembly is configured to provide the bale wrap to a bale wrapping system of the agricultural baler;

determine whether the bale wrap is segmented or continuous based on the bale wrap type;

control a braking system of the agricultural baler to establish a tension force at a weakened section of the bale wrap sufficient to separate a first portion of the bale wrap disposed about a bale from a second portion of the bale wrap disposed about a shaft of the bale wrap assembly in response to determining the bale wrap is segmented and the weakened section is positioned between the shaft of the bale wrap assembly and the bale; and control a cutting system of the agricultural baler to cut the bale wrap in response to determining the bale wrap is continuous and a target section of the bale wrap is positioned at the cutting system.

2. The control system of claim 1, comprising a user interface communicatively coupled to the controller, wherein the user interface is configured to output the bale wrap signal in response to operator input.

3. The control system of claim 1, comprising a sensor communicatively coupled to the controller, wherein the sensor is configured to output the bale wrap signal.

4. The control system of claim 3, wherein the sensor is configured to monitor an identifier on the bale wrap, and the sensor is configured to output the bale wrap signal based on the identifier.

5. The control system of claim 3, wherein the sensor comprises an optical sensor configured to detect perforations at the weakened section of the bale wrap, and the sensor is configured to output the bale wrap signal based on detection of the perforations at the weakened section.

6. The control system of claim 1, wherein the controller is configured to receive a signal indicative of a number of wraps of the bale wrap around the bale, and the controller is configured to determine the target section based on the number of wraps.

7. The control system of claim 1, wherein the controller is configured to control a tension arm actuator of the agricultural baler based on the bale wrap type to control a density of the bale.

8. The control system of claim 1, wherein the controller is configured to determine the target section of the bale wrap based on a density of the bale.

9. An agricultural baler, comprising:
a bale wrapping system configured to receive a bale wrap from a bale wrap assembly and to wrap a bale with the bale wrap;
a braking system configured to control a tension force on the bale wrap;
a cutting system configured to cut the bale wrap; and
a control system, comprising:
a controller comprising a memory and a processor, wherein the controller is communicatively coupled to the braking system and the cutting system, and the controller is configured to:
receive a bale wrap signal indicative of a bale wrap type of the bale wrap;
determine whether the bale wrap is segmented or continuous based on the bale wrap type;
control the braking system such that the tension force at a weakened section of the bale wrap is sufficient to separate a first portion of the bale wrap disposed about the bale from a second portion of the bale wrap disposed about a shaft of the bale wrap assembly in response to determining the bale wrap is segmented and the weakened section is positioned between the shaft of the bale wrap assembly and the bale; and control the cutting system to cut the bale wrap in response to determining the bale wrap is continuous and a target section of the bale wrap is positioned at the cutting system.

10. The agricultural baler of claim 9, wherein the control system comprises a user interface communicatively coupled to the controller, and the user interface is configured to output the bale wrap signal in response to operator input.

11. The agricultural baler of claim 9, wherein the control system comprises a sensor communicatively coupled to the controller, and the sensor is configured to output the bale wrap signal.

12. The agricultural baler of claim 11, wherein the sensor is configured to monitor an identifier on the bale wrap, and the sensor is configured to output the bale wrap signal based on the identifier.

13. The agricultural baler of claim 11, wherein the sensor comprises an optical sensor configured to detect perforations at the weakened section of the bale wrap, and the sensor is configured to output the bale wrap signal based on detection of the perforations at the weakened section.

14. The agricultural baler of claim 9, comprising a tension arm actuator, wherein the controller is configured to control the tension arm actuator based on the bale wrap type to control a density of the bale.

15. The agricultural baler of claim 9, wherein the controller is configured to determine the target section of the bale wrap based on a density of the bale.

16. An agricultural baler, comprising:

a controller comprising a memory and a processor, wherein the controller is configured to:

receive a bale wrap signal indicative of a bale wrap type of a bale wrap of a bale wrap assembly, determine whether the bale wrap is segmented or continuous based on the bale wrap type;

control a braking system of the agricultural baler to establish a tension force at a weakened section of the bale wrap sufficient to separate a first portion of the bale wrap disposed about a bale from a second portion of the bale wrap disposed about a shaft of the bale wrap assembly in response to determining the bale wrap is segmented and the weakened section is positioned between the shaft of the bale wrap assembly and the bale; and control a cutting system of the agricultural baler to cut the bale wrap in response to determining the bale wrap is continuous and a target section of the bale wrap is positioned at the cutting system.

17. The agricultural baler of claim 16, comprising a user interface communicatively coupled to the controller, wherein the user interface is configured to output the bale wrap signal in response to operator input.

18. The agricultural baler of claim 16, comprising a sensor communicatively coupled to the controller, wherein the sensor is configured to output the bale wrap signal.

19. The agricultural baler of claim 18, wherein the sensor is configured to monitor an identifier on the bale wrap, and the sensor is configured to output the bale wrap signal based on the identifier.

20. The agricultural baler of claim 16, wherein the controller is configured to:

control a tension arm actuator of the agricultural baler based on the bale wrap type to control a density of the bale, and determine the target section of the bale wrap based on the density of the bale.

* * * * *